United States Patent [19]

Barile et al.

[11] 3,952,967

[45] Apr. 27, 1976

[54] ENERGY DISSIPATOR FOR MOTOR VEHICLE SAFETY BELTS

[75] Inventors: Mario Barile; Francesco Canavesi; Pier Vincenzo Franchini, all of Turin, Italy

[73] Assignee: Fiat Societa per Azioni, Turin, Italy

[22] Filed: Apr. 30, 1975

[21] Appl. No.: 573,230

[30] Foreign Application Priority Data

June 4, 1974 Italy .................................. 68751/74

[52] U.S. Cl. .................... 242/107.4 R; 188/1 C; 280/744; 297/386
[51] Int. Cl.² .................. B65H 75/48; B60R 21/10; A47C 31/00
[58] Field of Search ............... 242/107.4 R, 107.4 A, 242/107.4 B, 107.4 E; 267/63 R, 67; 297/386; 188/1 B, 1 C; 280/150 SB

[56] References Cited
UNITED STATES PATENTS

| | | |
|---|---|---|
| 3,442,466 | 5/1969 | Fritsche ........................ 242/107.4 B |
| 3,632,060 | 1/1972 | Balder .......................... 242/107.4 R |
| 3,765,700 | 10/1973 | Littman ......................... 280/150 SB |
| 3,790,099 | 5/1972 | Beller .......................... 242/107.4 R |
| 3,881,667 | 5/1975 | Tandetzke ..................... 242/107.4 A |

*Primary Examiner*—Leonard D. Christian
*Attorney, Agent, or Firm*—Sughrue, Rothwell, Mion, Zinn & Macpeak

[57] ABSTRACT

An energy dissipator for a vehicle safety belt includes a reel on which one end of the belt is wound and anchored, the reel having two internal screw threads of opposite pitch in which respective bushes are threaded, so that in the event of an unwinding force on the reel due to a tension in the belt, for example on impact, the bushes are screwed towards each other and squash a deformable element interposed between the bushes.

4 Claims, 8 Drawing Figures

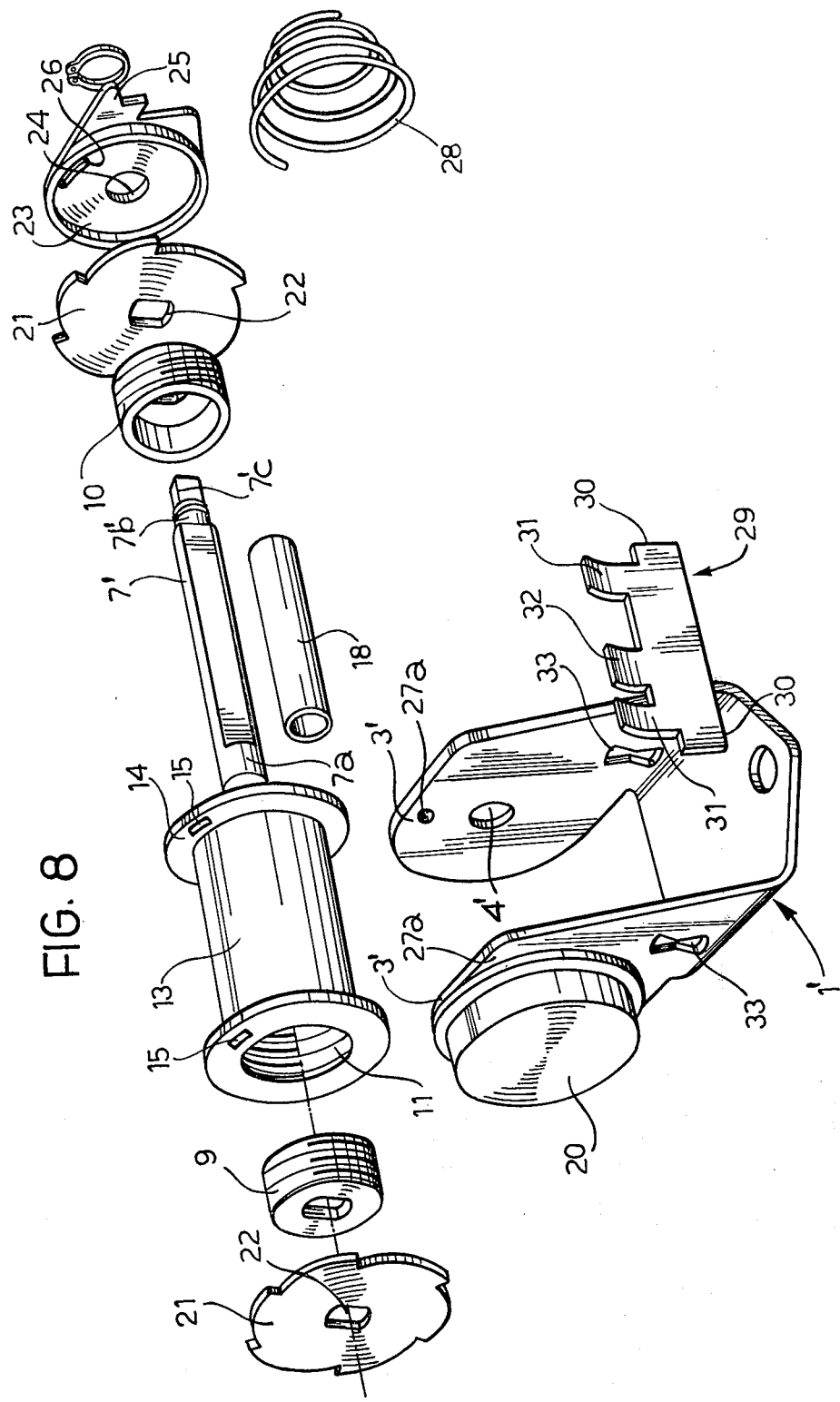

3,952,967

ENERGY DISSIPATOR FOR MOTOR VEHICLE SAFETY BELTS

BACKGROUND OF THE INVENTION

The present invention relates to energy dissipators for motor vehicle safety belts.

It is known that in order to reduce the effects of crashes on the occupants of a motor vehicle, safety belts are used to absorb, at the moment of impact, part of the energy of the occupants. This energy can be dissipated by various methods. One method is to use belts in which plastic deformations take place or which yield under predetermined loads.

Another method of energy dissipation is to provide the ends of the belts with mechanical energy dissipators which absorb energy by various means, for example by friction, by plastic torsion of bars, or by flexure of metal bands or like elements. This second method is preferable to the use of plastically deformable belts since the belts themselves retain a suitable elasticity and, in the case of belts having elements of predetermined breaking-point, the load on the belt during impact varies considerably. Such energy dissipators can be included in the winding up devices with which safety belts are frequently provided.

In the event of impact it is necessary that the travel of the vehicle safety belt should be limited during the dissipation of energy, so that the occupant of the seat does not come into contact with parts of the vehicle passenger compartment facing him. This requirement is particularly important for safety belts used in small cars.

An object of the present invention is to provide a seat belt energy dissipator of simple and robust construction which allows the belt, during the dissipation of energy, to travel over a distance which can be predetermined by calibration using a calibration seat.

SUMMARY OF THE INVENTION

According to the invention there is provided an energy dissipator for motor vehicle safety belts, comprising a support adapted to be mounted at a vehicle anchorage point, a flanged reel on which the safety belt is wound, one end of the belt being anchored to the reel, characterised in that the reel is provided at its opposite ends with two axial seatings threaded with equal helical pitches of opposite directions in which two correspondingly threaded bushes are seated, the bushes being mounted for axial sliding movement without rotation on a central shaft which is carried by the support and means interposed between the two bushes for opposing by the dissipation of energy the reciprocal approach of the two bushes in the event of rotation of the reel caused by unwinding of the belt.

BRIEF DESCRIPTION OF THE DRAWINGS

The invention will be further described, by way of non-limiting example, with reference to the appended drawings, in which:

FIG. 8 is an exploded perspective view of the energy dissipator shown in FIG. 5.

Referring to the drawings, FIGS. 1 to 4 illustrate an energy dissipator for vehicle seat belts of a simple type, comprising a U-shaped sheet metal support 1, having an intermediate flat portion 2 and two vertical side walls 3 parallel to each other. Each side wall 3 is provided with a non-circular hole 4. The intermediate portion 2 has an integral projection 5 provided with a circular hole 6 for fixing the support 1 to an anchorage point of the motor vehicle.

Figure 1:
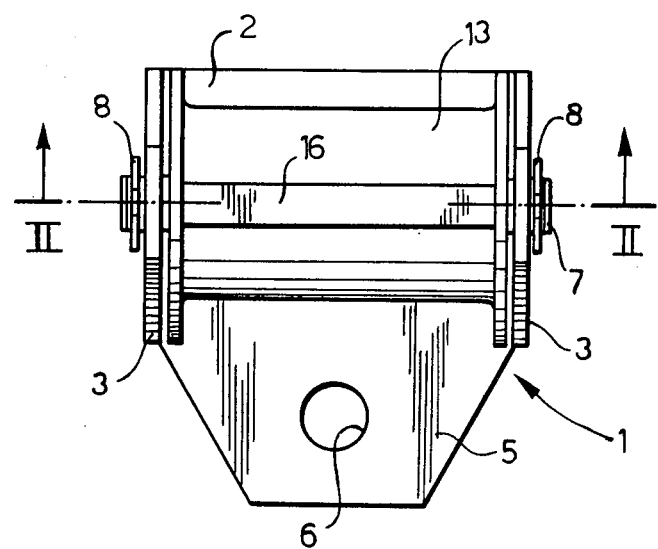
FIG. 1 is a plan view of an energy dissipator for vehicle safety belts according to one embodiment of the present invention.

In the two non-circular holes 4 of the parallel side walls 3 of the support 1 a shaft 7 of polygonal or non-circular cross section is received, the shaft being retained axially by two annular retaining clips 8. On the intermediate portion of the shaft 7 between the two side walls there are positioned two slidable but non-rotatable bushes 9, 10, which are externally threaded with equal pitches of opposite direction. The bushes 9, 10 engage in corresponding internally threaded seatings 11 and 12 in opposite ends of a reel 13 having end flanges 14. A strap forming a safety belt 17 is wound on the reel 13, the end of the strap being anchored to a transverse element 16 which is inserted in two slots 15 formed in the two flanges 14 of the reel 13 and aligned with each other in a direction parallel to the axis of the reel.

Figure 2:
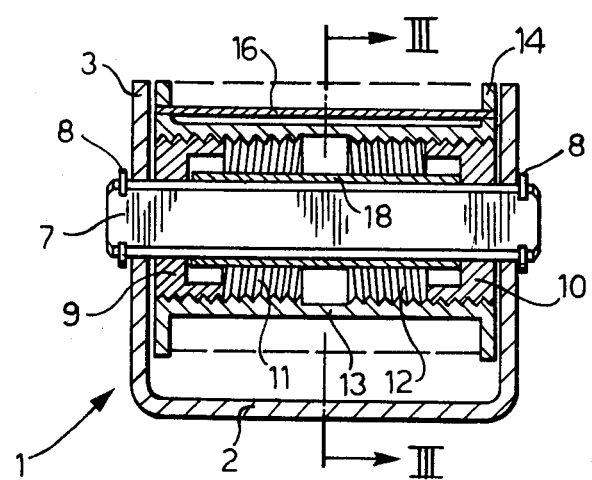
FIG. 2 is an axial section of the dissipator, taken along the line II—II of FIG. 1.
Figure 3:
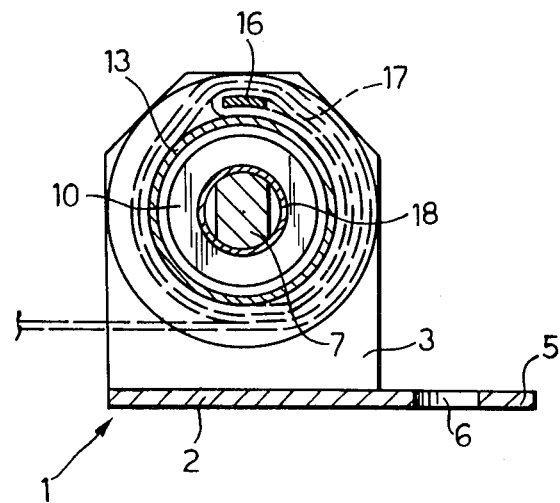
FIG. 3 is a transverse cross-section, taken along line III—III of FIG. 2.
Figure 4:
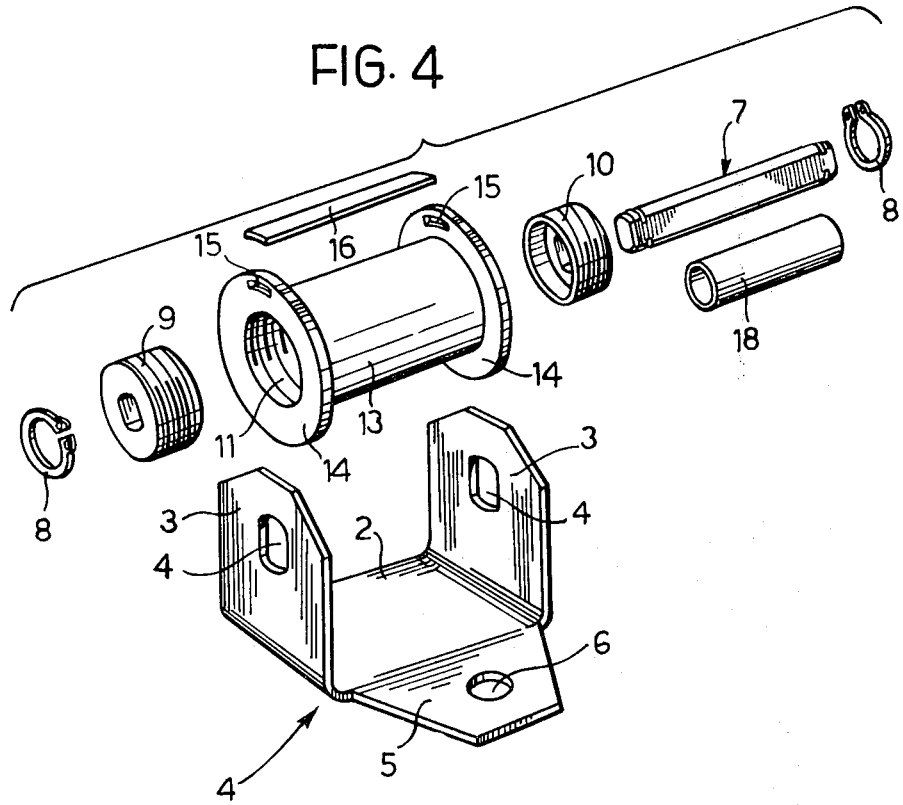
FIG. 4 is an exploded perspective view of the energy dissipator.

Between the inner ends of the threaded bushes 9, 10, there is interposed an element 18 capable of absorbing a considerable amount of energy by deformation. In the embodiment illustrated in FIGS. 1 to 4 the element 18 comprises a metal tube, preferably of brass, which suffers plastic deformation when subjected to a sufficiently high axial loading. Such loading occurs in the event of vehicle impact when the belt 17 wound around the reel applies a force tending to rotate the reel. Because the threaded bushes 9 and 10 cannot rotate, being engaged non-rotatably on the non-circular section of the shaft 7, the bushes 9, 10 rotate relative to the reel 13 in the respective internally threaded seatings 11 and 12 and advance towards each other, causing axial deformation of the deformable tube 18 by squashing.

The tube 18 can be replaced by any other deformable element capable of acting as an energy absorber when subjected to axial loads, or by a high-viscosity liquid which is forced through calibrated flow-restricting passages when the two bushes 9, 10 are screwed towards each other.

Figure 5:
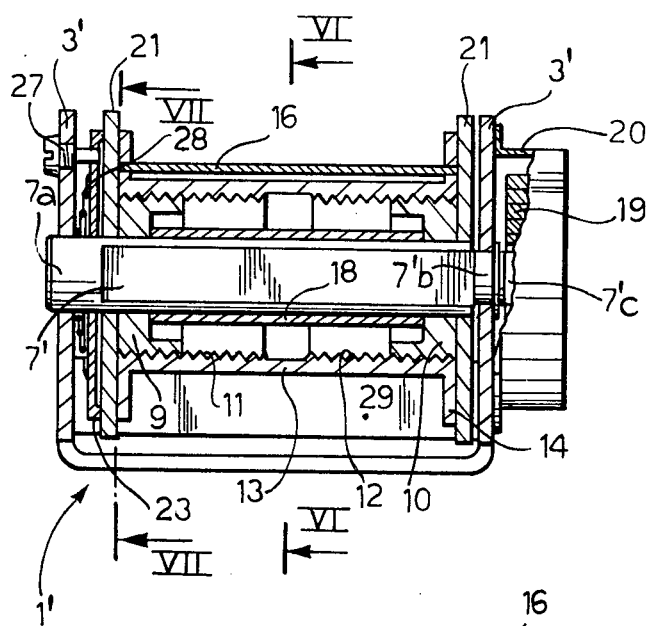
FIG. 5 is an axial section, similar to that of FIG. 2, of an energy dissipator according to another embodiment of the invention.
Figure 6:
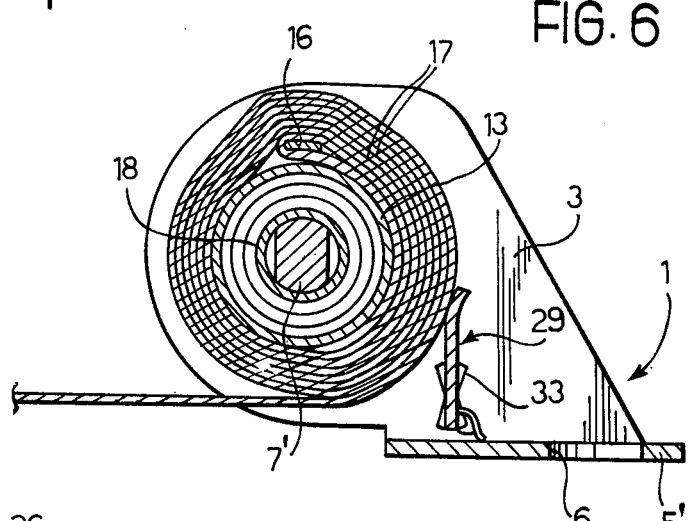
FIGS. 6 and 7 are two transverse cross-sections, taken respectively along lines VI—VI, VII—VII of FIG. 5.
Figure 7:
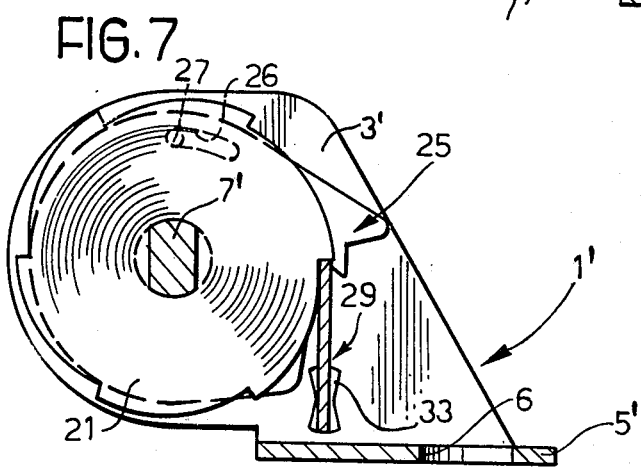

FIGS. 5 to 8 illustrate another embodiment of an energy dissipator according to the invention associated with a known type of winder for taking up slack in a seat belt. In this embodiment a support 1' of slightly different shape is used in which the parallel side walls 3, 3' are formed integrally with a flat projection 5' which corresponds to the projection 5 of the previously described embodiments, the intermediate flat portion being omitted. The two parallel walls 3, 3' are provided with circular holes 4' engaging opposite cylindrical portions 7'a and 7'b of a shaft 7' having a central portion of polygonal or non-circular section and an axially projecting end section 7'c of non-circular cross-section adjoining the cylindrical portion 7'b. A torsion spring 19 enclosed in a housing 20 on the outside of the side wall 3' is connected to the end section 7'c and constitutes the take-up winding unit. The shaft 7' can, therefore, rotate relatively to the support 1' in contradistinction to the shaft 7 in the embodiment of FIGS. 1 to 4.

As in the previously illustrated embodiment, the shaft 7' carries two externally threaded bushes 9, 10 adapted to co-operate with internally threaded seatings 11, 12 disposed within a cylindrical reel 13 provided with end flanges 14. The safety belt 17 is wound on the reel 13, one end of the belt being anchored to a transverse element 16 inserted in slots 15 in the flanges 14.

A toothed ratchet wheel 21 is arranged on the outside of each flange 14 of the reel 13. The ratchet wheel 21 has a central non-circular hole 22 which fits on the central portion of the shaft 7' of corresponding cross-section in such a manner as to be keyed to it. On the outside of one of the ratchet wheels 21 there is arranged a third wheel 23 having a central circular hole 24 and mounted on the cylindrical portion 7'a of the shaft 7' in such a manner that it can rotate freely on the latter. The rotation of the wheel 23 is, however, limited by the engagement of an axially eccentric screw 27 which screws into a threaded hole 27a in the adjacent side wall 3' of the support 1 and which is inserted in a slot 26 in the wheel 23. The wheel 23 is provided with a radially outwardly projecting tooth 25 having a greater outward projection than that of the teeth of the two ratchet wheels 21. A helical spring 28 is interposed between the adjacent side wall 3' and the wheel 23, urging the latter towards the adjacent ratchet wheel 21.

A pivoted pawl plate 29 extends transversely between the two parallel side walls 3' and has outwardly projecting ends 30 which engage in profiled slots 33 in the respective side walls 3' to permit limited pivotal movement of the plate 29. The plate 29 is loaded by a spring not shown, which urges the plate towards the reel 13. The pawl plate 29 has two end lips 31 adapted to co-operate with the toothed ratchet wheels 21 and with the tooth 25 of the wheel 23 and a central lip 32 adapted to make contact with the belt 17 wound on the reel 13.

The ratchet wheels 21 are mounted in a manner which allows the winding up of the belt 17 when taking up slack, when the reel 13 is rotated by the spring 19.

When a suitable amount of the belt 17 has been wound around the reel 13, the pawl plate 29 is displaced in such a manner that it ceases to make contact either with the teeth of the ratchet wheels 21 or with the tooth 25 of the wheel 23. When the belt 17 starts to unwind from the reel 13, upon being pulled by the occupant of the associated vehicle seat when strapping into the seat, the plate 29, urged by its own return spring, is displaced towards the reel so that initially it engages the tooth 25 of the wheel 23, remaining locked on this tooth to allow the free rotation of the reel 13, accompanied by rotation of the wheel 23, which in turn rotates the shaft 7', the bushes 9 and 10 and the two ratchet wheels 21.

When the belt is even slightly slackened after having been unwound from the reel 13, the return spring 19 causes a slight rewinding rotation of the shaft 7' sufficient to disengage the pivoted pawl plate 29 from the tooth 25, while allowing the plate to come into engagement with teeth of the two ratchet wheels 21, thereby locking the ratchet wheels and the shaft 7' against any further rotation relatively to the support 1'. If under these conditions, the belt 17 is subjected to a jerk, such as to make the reel 13 rotate, the threaded bushes 9, 10 will be screwed towards each other, causing squashing of the deformable element 18 and thereby absorbing energy from the belt 17.

It will be understood that practical embodiments of the present invention and details of construction can be widely varied, relatively to what has been described and illustrated, without, however, going outside the scope of the present invention.

We claim:

1. Energy dissipator for motor vehicle safety belts, comprising a support adapted to be mounted at a vehicle anchorage point, a flanged reel on which the safety belt is wound in use of the dissipator and means for anchoring one end of the belt to the reel, wherein the improvement consists in the combination of two axially extending seatings at opposite ends of the reel, said seatings being screw-threaded with equal helical pitches of opposite directions, two correspondingly threaded bushes engaged with said threaded seatings, a shaft carried by the support, the bushes being mounted for axial sliding movement without rotation on said shaft, and means interposed between the two bushes for opposing by the dissipation of energy movement of the two bushes towards each other in the event of rotation of the reel caused by unwinding of the belt therefrom.

2. The energy dissipator defined in claim 1, wherein that the means for opposing the approach of the two bushes are constituted by a deformable tubular element, energy being dissipated by squashing of said element between the bushes upon mutual approach of the bushes.

3. The energy dissipator defined in claim 2, wherein the tubular deformable element comprises a metal tube which is capable of plastic deformation.

4. The energy dissipator defined in claim 1, including a winding device associated with the reel for taking up slack in the belt.

* * * * *